United States Patent
Ota et al.

(10) Patent No.: US 10,885,079 B2
(45) Date of Patent: Jan. 5, 2021

(54) VOICE-ACTIVATED EVENTS MANAGEMENT SYSTEM

(71) Applicant: salesforce.com, inc., San Francisco, CA (US)

(72) Inventors: Kevin Ota, Los Angeles, CA (US); Adam Drazic, Renton, WA (US); Nicholas Howland, Kansas City, MO (US); Rob Christensen, Belmont, CA (US); Karson Miller, El Sobronte, CA (US); Jo Chan, Oakland, CA (US); Takashi Arai, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 337 days.

(21) Appl. No.: 16/135,179

(22) Filed: Sep. 19, 2018

(65) Prior Publication Data

US 2020/0089805 A1 Mar. 19, 2020

(51) Int. Cl.
*G06F 16/00* (2019.01)
*G06F 16/332* (2019.01)
*G06F 16/9535* (2019.01)

(52) U.S. Cl.
CPC ...... *G06F 16/3329* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 9,891,056 B2* | 2/2018 | Xu | H04W 4/024 |
| 2007/0033005 A1* | 2/2007 | Cristo | G10L 15/19 704/9 |
| 2009/0319306 A1* | 12/2009 | Chanick | G07B 15/00 705/5 |
| 2018/0329889 A1* | 11/2018 | Badr | G06F 9/54 |

* cited by examiner

*Primary Examiner* — Anhtai V Tran
(74) *Attorney, Agent, or Firm* — Sterne, Kessler, Goldstein & Fox P.L.L.C.

(57) ABSTRACT

Disclosed herein are system, method, and computer program product embodiments for providing voice-activated events management. An embodiment operates by receiving an audio-formatted query through an application associated with an event. A first user ID, registered with the event, is determined to be associated with the mobile device. It is determined whether the query is an event query or a user query based on one or more keywords. Based on the determination that the query is either the event query or the user query, the answer to the event query is determined from data retrieved over a network, or the answer to the user query is determined from the locally stored data at the mobile device. The determined answer to the query is provided via the application operating on the mobile device.

20 Claims, 4 Drawing Sheets

VOICE-ACTIVATED EVENTS MANAGEMENT SYSTEM

BACKGROUND

Events, such as conferences and seminars can have hundreds or even thousands of people in attendance. These events can span large geographic areas, and may include people having different roles, such as attendees and presenters, each with their own unique schedules. While ushers and other posted employees may answer general questions to help these individuals navigate around the event area, this generalized assistance may not be enough to satisfy the needs of each individual when they need help.

BRIEF DESCRIPTION OF THE DRAWINGS

The accompanying drawings are incorporated herein and form a part of the specification.

FIGS. 3A and 3B are example illustrations related to the functionality of a voice-activated events management system, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a voice-activated events management system.

Figure 1:
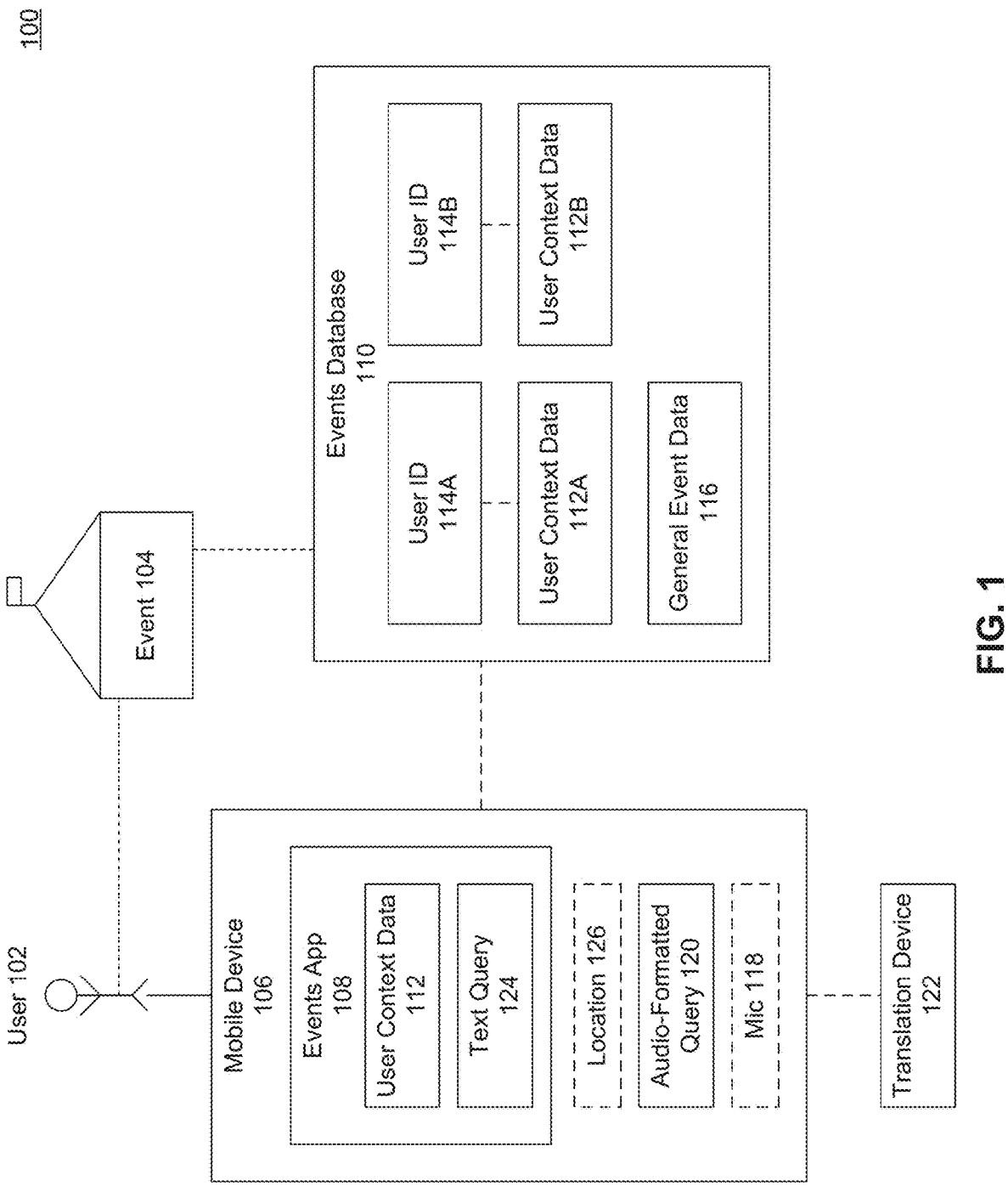
FIG. 1 is a block diagram illustrating example functionality for providing a voice-activated events management system, according to some embodiments.

FIG. 1 is a block diagram 100 illustrating example functionality for providing a voice-activated events management system according to some embodiments. In an embodiment, a user 102 may be attending an event 104 and may use the voice-activated events management system to navigate their way around event 104 and access both general information about event 104, and specific information regarding their unique participation and scheduling during event 104.

Event 104 may be a conference, concert, meeting, or any other get together of people, that may be held across one or more geographic locations. For example, event 104 may be a conference that includes seminars or meetings that are conducted in different buildings across a campus of a university or corporation, or across a city or country. In an embodiment, event 104 may include a national or international sporting event such as the World Cup, or Olympics. Event 104 may last for a finite period of time, such as a day, several days, or several weeks.

User 102 may include an attendee or audience member of event 104, or employee who is performing some functionality in support of event 104. Example users 102 may include an audience member, performer, presenter, moderator, security guard, maintenance worker, staffer, intern, organizer, cafeteria worker, or other attendee of event 104.

Large scale events of thousands of people that span multiple days and/or buildings across a geographic area, often require a lot of coordination amongst various individuals, particularly when it comes to attendees 102 trying to figure out their schedules and have their individual needs satisfied. These attendees will often have user-specific questions about their specific schedules, locations as to where they are supposed to be next and how to get there, and other questions about speakers or other specific user needs. But they will also often have general questions about the location of a registration area, background information on the geographic area or presenters, etc.

It is almost impossible to provide enough ushers or other help staff to address every user's question when they are having it. As such, users 102 may use their mobile devices 106 to answer many of their questions during event 104.

For example, users 102 may use their mobile device 106 to try and navigate a geographic area of event 104, however a general mapping application does not have access to a particular user's event schedule or the diagrams of particular buildings where sessions are being held. Also, using a general mapping application requires a user to both know where they are beginning their journey, and the name or address of a destination to which a user wants to travel. However, a conference attendee 102 may not always have this information accessible and may not know where they are, may not know their schedule, and/or may not know the name/location of the building or room where they are supposed to be next. To address these problems and more, user 102 may have access to an events app 108 on their mobile device 106.

Events app 108 may include or have access to both general information about event 104 (e.g., general event data 116) and more specific information about a conference attendee or other user 102 (e.g., user context data 112). In an embodiment, mobile device 106, through events app 108, may download or synchronize this information with an events database 110.

Events database 110 may include network servers or other computing devices that store and synchronize events-related data and information before, during, and/or after event 104. The events data may include information indicating times/locations of seminars, speeches, or other sub-events that are associated with event 104, user registration information about the various sub-events, locations or details on user amenities (refreshments, food, registration, things to see and/or do, etc.), background information about speakers or seminar topics, etc.

In an embodiment, events app 108 may request or download user context data 112 from events database 110 during an initial synchronization session. User context data 112 may include information that is specific or pertinent to a user's 102 particular schedule and/or role with regard to event 104.

User context data 112 may include the time/location of sub-events or seminars to which the user has or can register, background information about the presenters, speakers, or topics of those sub-events, work shifts, lodging and/or transportation information specific for the user, etc. In an embodiment, user context data 112 may also include general event information, such as frequently asked questions about event 104, speakers, subjects, or a geographic area where event 104 is being held.

Downloading and storing user context data 112 locally on mobile device 106 may prevent the usage of extra-bandwidth that may otherwise be required with multiple back-and-forth network communications between mobile device 106 and events database 110 when a user has a question or query about user context data 112. For example, executing a query on locally stored data may be faster than executing a similar query over a network connection, and may consume fewer processing resources of events database 110 and less network bandwidth.

This initial downloading of data may help prevent servers (of events database 110) from becoming overloaded and crashing with too many requests from different users 102. Having the relevant user context data 112 locally available on mobile device 106 may also be beneficial when mobile device 106 is located in an area with low/no network connectivity.

In an embodiment, a user 102 may login to events app 108 with a user ID 114 and password. Events app 108 may use this user ID 114 to request user-relevant information (i.e., user context data 112) from events database 110 associated with user 102 and/or mobile device 106. Events database 110 may also include general event data 116 which may include any information that is not specific to a particular user or group of users (or user IDs 114), but may be relevant to anyone with general questions about event 104.

Mobile device 106 may enable user 102 to interact with events app 108 using their voice. For example, mobile device 106 may include a microphone 118 which is configured to receive and/or record or store a user's voice as audio-formatted query 120. Audio-formatted query 120 may be a recording or buffered voice file. In an embodiment, mobile device 106 may provide this audio-formatted query 120 to a translation device 122.

In an embodiment, translation device 122 may be a separate server or computing device that includes natural language processing capabilities. Translation device 122 may process audio-formatted query 120, and generate and return a voice-to-text translated or transcripted text query 124 to events app 108. Text query 124 may include an audio-to-text transcription of audio-formatted query 120. In an embodiment, translation device 122 may include language translation capabilities, such that audio-formatted query 120 may be translated into a different language as text query 124.

Text query 124 may include the text-translation of a spoken word, audio-formatted query 120 received from user 102. In an embodiment, events app 108 may determine whether text query 124 is executable against user context data 112 or whether text query 124 is to be executed against other data (such as general event data 116) stored at events database 110.

In an embodiment, events app 108 may search text query 124 for keywords that indicate user context data 112 is relevant. Example keywords include "my" or "I". For example, if a user asks a question such as "Where is my next meeting?" or "How do I access my schedule?", events app 106 may execute text query 124 against user context data 112. Executing text query 124 against locally stored user context data 112 may be performed without consuming transmission bandwidth and events database 110 server resources. This may save both time and processing resources in generating an answer to audio-formatted query 120 or text query 124.

Mobile device 106 may then visually and/or audibly provide an answer to user 102 via events app 108. For example, events app 108 may include a text output indicating the generated answer. The output may include selectable links to other data or webpages with the requested data or relevant resources. In an embodiment, events app 108 may be configured to provide audible output using a speaker of mobile device 106.

However, if either text query 124 does not include a particular user context keyword, or user context data 112 does not return an answer, text query 124 may be provided to otherwise executed against the data of events database 110. Events database 110 may return an answer which may then be provided visually and/or audibly via events app 108 on mobile device 106.

In an embodiment, the answer provided in response to audio-formatted query 120 may vary depending on whether or not the event 104 is in progress. For example, while the event is in progress the query "who is the keynote speaker?" may return an event-based answer including the identification and background of the keynote speaker of event 104. However, if the event has ended, then the same query may return a general answer describing what a keynote speaker is, or may request additional information.

If an answer to text query 124 cannot be found through querying events database 110, or audio-formatted query 120 cannot be translated to text query 124, then events app 108 may connect user 102 to an human agent. User 102 may speak or text/type and interact with the human agent through events app 108.

In an embodiment, events app may receive a location 126 of mobile device 106 within an event area in order to provide a user 104 with directions on how to get to certain locations, in response to a text query 124. For example, a user may ask "How do I get to my next event?" Event app 108 may use location 126 as a starting point and guide user 102 or provide directions to the next event location based on a schedule from user context data 112. Or user 102 may ask "where is the closest restroom?" To which events app 108 may use location 126 as a starting point to answer the query from general event data 116.

Figure 2:
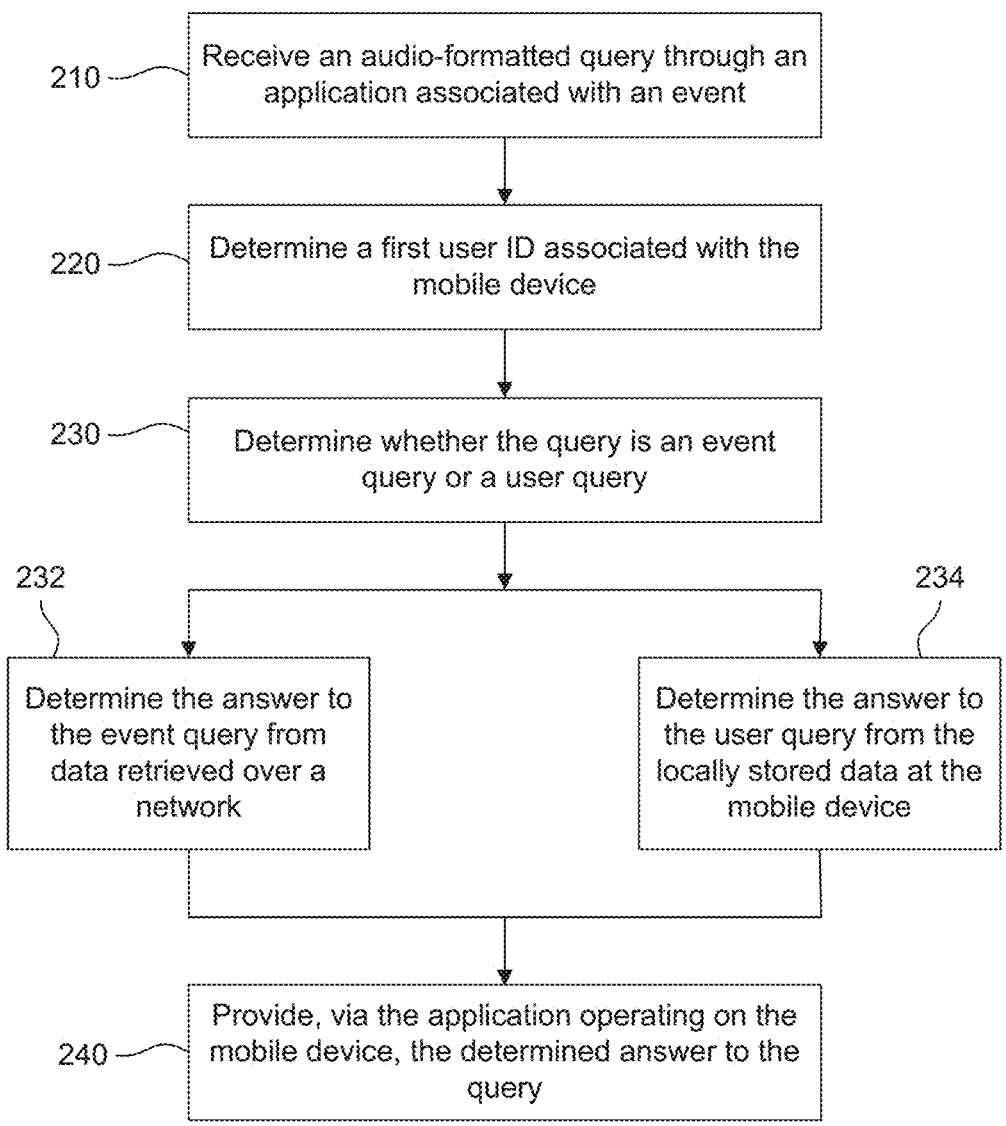
FIG. 2 is a flowchart illustrating example operations of a voice-activated events management system, according to some embodiments.

FIG. 2 is a flowchart 200 illustrating example operations of a voice-activated events management system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, an audio-formatted query is received through an application associated with an event. For example, a user 102 operating mobile device 106 may press a 'microphone' button in an interface of events app 108. The button may cause a mic 118 (of mobile device 106) to activate and record sounds that are (temporarily) stored and/or processed as audio-formatted query 120 and translated into text query 124. The events app 108 may include or have access to information about an event 104, which may be a multi-day or multi-venue conference, which may have multiple seminars or sub-events throughout the course of event 104.

In an embodiment, events app 108 may coordinate with a translation device 122 to generate or retrieve a text query 124 corresponding to audio-formatted query 120. In an embodiment, translation device 122 may be integrated within mobile device 106. In another embodiment, translation device 122 may be a network-accessible service. In an embodiment, each detected spoken word may be translated one at a time, and/or groups of words may be translated or re-translated together to detect various phrases. In an embodiment, events app 108 may provide a visual display of text query 124 as audio-formatted query 120 is being processed in real-time.

In 220, a first user ID associated with the mobile device is determined. For example, a user 102 may log into events app 108, or events app 108 may retrieve a user ID 112 associated with 102 or a mobile ID (e.g., such as an IP address, or telephone number) associated with mobile device 106. In an embodiment, events app 108 may use user ID 112 to request or retrieve user context data 112A or 112B relevant to user 102. Events app 108 may retrieve and store this user context data 112 locally at mobile device 106, and execute queries against this data.

The user ID 114 may be registered with a list of registrants of event 104. For example, user ID 114 may correspond to an attendee or audience member of event 104. In other embodiments, user ID 114 may be a security guard, maintenance worker, volunteer, or other event staff or performer. A user's schedule or context data 112 may vary based on the role or group under which they are registered. The corresponding user role information, based on the registration type, may be downloaded to mobile device 106 as user context data 112.

In 230, it may be determined whether the query is an event query or a user query. For example, events app 108 may scan text query 124 for one or more keywords indicating whether the query is directed to user context data 112 (a user query) or general event data 116 (an event query).

In an embodiment, an event query may be a query such that the answer to the query is consistent or the same regardless of how is asking the question (e.g., across two or more different user IDs 114A, 114B). Example event queries may be "Where is the registration booth?" and "Who is the keynote speaker?"

By contrast, a user query may depend on which user ID 112 is associated with the query, or from which mobile device 106 the audio-formatted query 120/translated text query 124 is received. Example user queries may be "How do I get to the registration booth?" (the answer for which may depend on a user's location 126), and "Who is the speaker at my next meeting?" (the answer which may depend on which meeting the user is registered to go to next).

Another example query may be "What time is lunch?" which may be either a user query if the answer depends on user's schedule, if multiple lunch times are provided across groups of users or attendees 102, or an event query if all the users 102 have the same lunch time or lunch schedule.

In an embodiment, if keywords such as "my" or "I" are identified in text query 124, then events app 108 may determine that text query 124 is a user query and processing can continue at 234. If however, no user query keywords are identified in text query 124, then processing may continue at 232.

In 234, the answer to the user query is determined from locally stored data at the mobile device. For example, events app 108 may execute text query 124 against user context data 112 to generate an answer to audio-formatted query 120. In an embodiment, if no answer to the query is found in user context data 112, processing may continue at 232.

In 232, events app 108 may provide text query 124 to events database 110, which may execute text query 124 against user context data 112 and/or general event data 116 and return an answer to events app 108.

In 240, the determined answer is provided via the application operating on the mobile device. For example, answers may be provided for display as text on mobile device 106 and/or as audio output through a speaker of mobile device 106.

In an embodiment, if no answer can be determined (from either user context data 112 or general event data 116), then events app 108 may provide a user 102 an option of texting or chatting with an agent who may be able to manually assist the user. In an embodiment, the user 102 may continue using their voice to communicate with the agent through events app 108 as described above. In an embodiment, events app 108 may direct user to nearest usher or information booth.

Figures 3A, 3B:
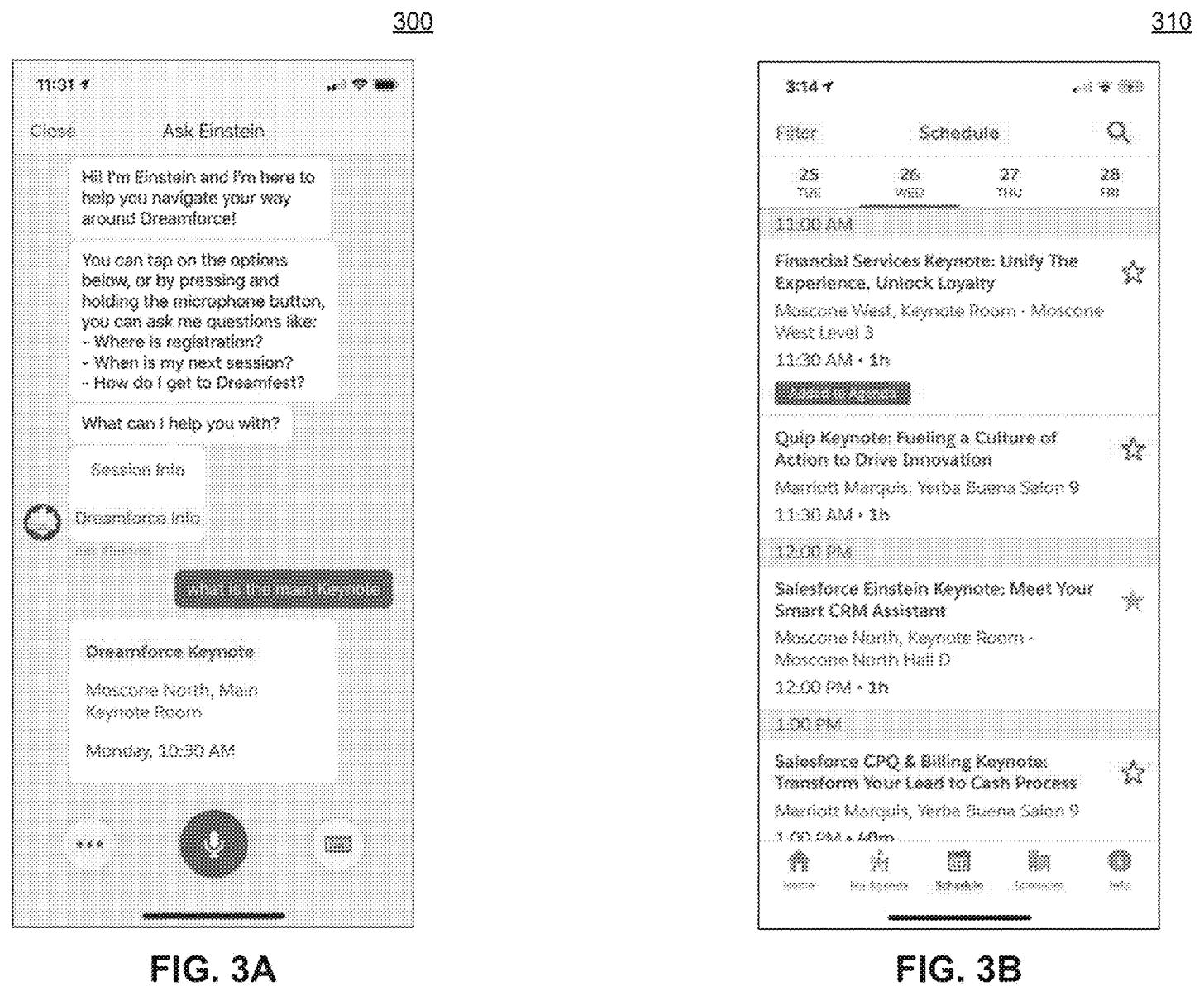

FIGS. 3A and 3B are example illustrations related to the functionality of a voice-activated events management system, according to some embodiments. FIG. 3A illustrates an example interface 300 of a voice events-navigation system that is communicating with a user 102. For example, the voice events-navigation system (Einstein) may enable a user to select "Session Info" or "Dreamforce Info" buttons. In an embodiment, session info may correspond to user context data 112, while Dreamforce info may correspond to general event data 116. In the example shown, Dreamforce may be the name of an event 104.

In an embodiment, a user may press the microphone button and speak a response or query. In the example shown, the user 102 has spoken words which are displayed as text query 124 "what is the main Keynote". Events app 108 may retrieve that information from general events data 116, since no user-specific keywords are identified.

FIG. 3B illustrates an example interface response 310 by the voice activated system (Einstein) of FIG. 3A. The example illustrates an example response to a user request such as "What is my schedule". Events app 108 may retrieve user context data 112 and display the schedule shown on FIG. 3B.

Figure 4:
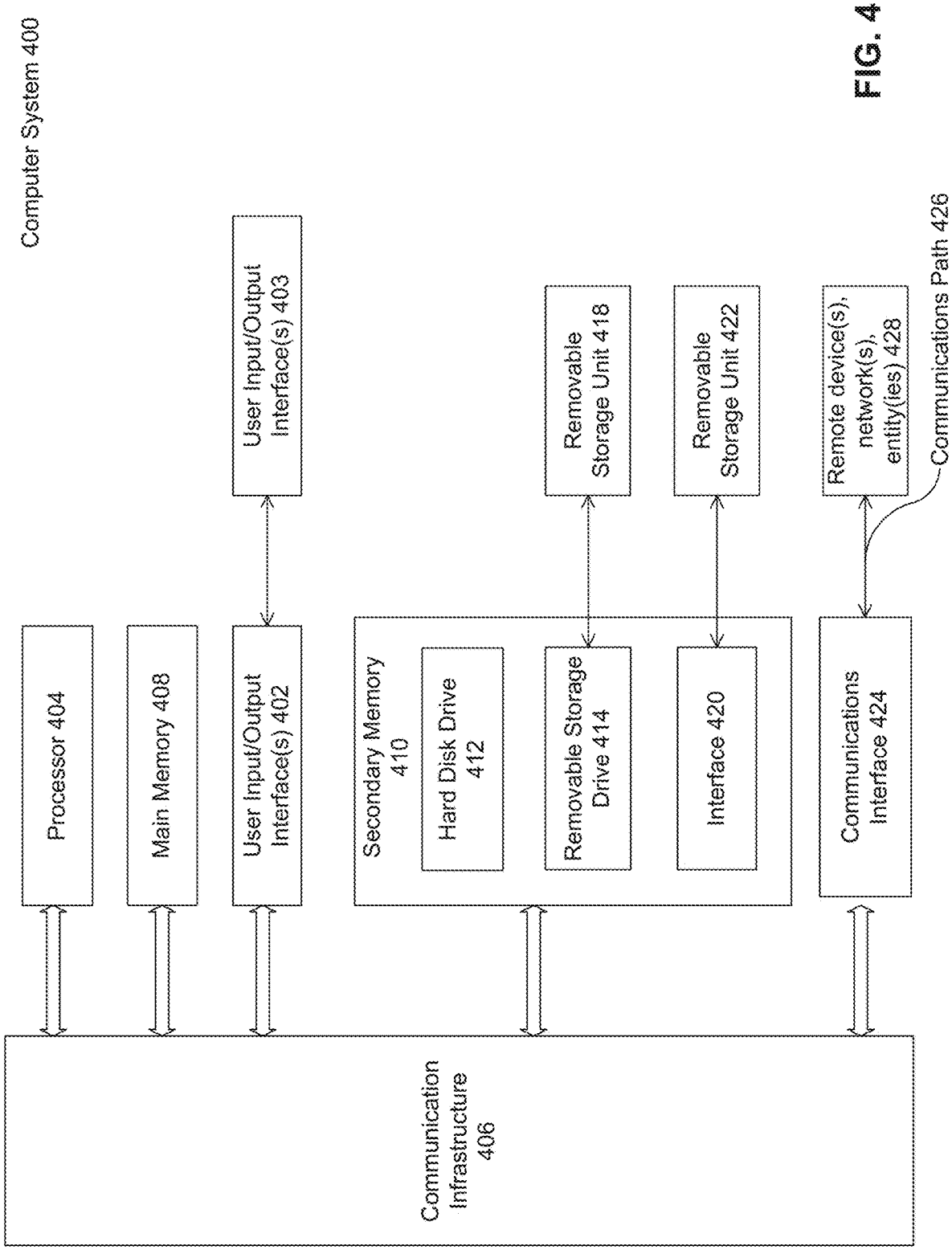
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
   receiving an audio-formatted query through an application associated with an event, wherein the application includes locally stored data regarding the event and is operating on a mobile device;
   determining a first user ID associated with the mobile device, wherein the first user ID is registered with the event;
   determining whether the query is an event query or a user query based on one or more keywords, wherein an answer to the event query is consistent across both the first user ID and a second user ID, and wherein an answer to the user query is different between the first user ID and the second user ID;
   based on the determination that the query is either the event query or the user query, determining the answer to the event query from data retrieved over a network, or determining the answer to the user query from the locally stored data at the mobile device; and
   providing, via the application operating on the mobile device, the determined answer to the query.

2. The method of claim 1, further comprising:
   determining a text-formatted transcription of the audio-formatted query, wherein the answer to the query is determined based on the text-formatted transcription.

3. The method of claim 2, wherein the determining whether the query is a user query comprises:
   determining whether the text-formatted transcription includes one or more keywords; and
   determining that the audio-formatted query is the user query based on the determination that the text-formatted transcription includes at least one of the keywords.

4. The method of claim 2, wherein the determining whether the query is an event query comprises:
   determining whether the text-formatted transcription includes one or more keywords; and
   determining that the audio-formatted query is the event query based on the determination that the text-formatted transcription does not include any of the keywords.

5. The method of claim 1, wherein the query is associated with a schedule associated with the first user ID during the event, and wherein the locally stored data includes information regarding the schedule of the first user ID.

6. The method of claim 1, wherein the locally stored data regarding the event is stored on the mobile device prior to receiving the audio-formatted query.

7. The method of claim 1, wherein the determining the answer to the event query comprises:
   determining a general answer to the event query;
   determining an event-based answer to the event query, wherein the event-based answer is different from the general answer;
   determining that the event is in progress at a time of the receiving the audio-formatted query; and
   providing the event-based answer responsive to the event query based on event being in progress.

8. The method of claim 1, wherein the determining the answer to the user query comprises: determining a location of the mobile device; and determining the answer to the user query, based at least on the location.

9. A system comprising:
   a memory; and
   at least one processor coupled to the memory and configured to:
      receive an audio-formatted query through an application associated with an event, wherein the application includes locally stored data regarding the event and is operating on a mobile device;
      determine a first user ID associated with the mobile device, wherein the first user ID is registered with the event;
      determine whether the query is an event query or a user query based on one or more keywords, wherein an answer to the event query is consistent across both the first user ID and a second user ID, and wherein an answer to the user query is different between the first user ID and the second user ID;
      based on the determination that the query is either the event query or the user query, determine the answer to the event query from data retrieved over a network, or determine the answer to the user query from the locally stored data at the mobile device; and
      provide, via the application operating on the mobile device; the determined answer to the query.

10. The system of claim 9, wherein the at least one processor is further configured to execute operations is configured to:
    determine a text-formatted transcription of the audio-formatted query, wherein the answer to the query is determined based on the text-formatted transcription.

11. The system of claim 10, wherein the at least one processor that determines whether the query is a user query is configured to:
    determine whether the text-formatted transcription includes one or more keywords; and
    determine that the audio-formatted query is the user query based on the determination that the text-formatted transcription includes at least one of the keywords.

12. The system of claim 10, wherein the at least one processor that determines whether the query is an event query is configured to:
    determine whether the text-formatted transcription includes one or more keywords; and
    determine that the audio-formatted query is the event query based on the determination that the text-formatted transcription does not include any of the keywords.

13. The system of claim 9, wherein the query is associated with a schedule associated with the first user ID during the event, and wherein the locally stored data includes information regarding the schedule of the first user ID.

14. The system of claim 9, wherein the locally stored data regarding the event is stored on the mobile device prior to receiving the audio-formatted query.

15. The system of claim 9, wherein the at least one processor that determines the answer to the event query is configured to execute operations that cause it to:
    determine a general answer to the event query;
    determine an event-based answer to the event query, wherein the event-based answer is different from the general answer;
    determine that the event is in progress at a time of the receiving the audio-formatted query; and provide the event-based answer responsive to the event query based on event being in progress.

16. The system of claim 9, wherein the at least one processor that determine the answer to the user query is configured to execute operations that cause it to: determine a location of the mobile device; and determine the answer to the user query, based at least on the location.

17. A non-transitory computer-readable device having instructions stored thereon that, when executed by at least one computing device, cause the at least one computing device to perform operations comprising:
- receiving an audio-formatted query through an application associated with an event, wherein the application includes locally stored data regarding the event and is operating on a mobile device;
- determining a first user ID associated with the mobile device, wherein the first user ID is registered with the event;
- determining whether the query is an event query or a user query based on one or more keywords, wherein an answer to the event query is consistent across both the first user ID and a second user ID, and wherein an answer to the user query is different between the first user ID and the second user ID;
- based on the determination that the query is either the event query or the user query, determining the answer to the event query from data retrieved over a network, or determining the answer to the user query from the locally stored data at the mobile device; and
- providing, via the application operating on the mobile device; the determined answer to the query.

18. The device of claim 17, wherein the instructions further cause the at least one processor to perform operations comprising:
- determining a text-formatted transcription of the audio-formatted query, wherein the answer to the query is determined based on the text-formatted transcription.

19. The device of claim 17, wherein the query is associated with a schedule associated with the first user ID during the event, and wherein the locally stored data includes information regarding the schedule of the first user ID.

20. The device of claim 19, wherein the instructions further cause the at least one processor to perform operations comprising:
- determining that the text-formatted transcription includes one or more keywords; and
- querying the schedule based on the determination that the text-formatted transcription includes at least one of the keywords.

* * * * *